(12) United States Patent
Hughes

(10) Patent No.: US 6,566,625 B1
(45) Date of Patent: May 20, 2003

(54) WELDING APPARATUS AND METHOD

(75) Inventor: Russell Vernon Hughes, Coventry (GB)

(73) Assignee: ARC Kinetics Limited, Coventry (GB)

( * ) Notice: Subject to any disclaimer, the term of this patent is extended or adjusted under 35 U.S.C. 154(b) by 0 days.

(21) Appl. No.: 09/856,232

(22) PCT Filed: Nov. 22, 1999

(86) PCT No.: PCT/GB99/03874

§ 371 (c)(1),
(2), (4) Date: Jun. 16, 2001

(87) PCT Pub. No.: WO00/30797

PCT Pub. Date: Jun. 2, 2000

(30) Foreign Application Priority Data

Nov. 21, 1998 (GB) .............................................. 9825452

(51) Int. Cl.⁷ .............................................. B23K 10/00
(52) U.S. Cl. ............................ 219/121.46; 219/121.59; 219/121.54; 219/121.57; 219/130.4; 219/130.32
(58) Field of Search ....................... 219/121.52, 121.48, 219/121.54, 121.57, 121.45, 130.4, 130.32, 121.46, 75

(56) References Cited

U.S. PATENT DOCUMENTS

| | | | | |
|---|---|---|---|---|
| 3,594,541 A | * | 7/1971 | Gorman et al. | 219/121.57 |
| 5,548,097 A | * | 8/1996 | Couch, Jr. et al. | 219/121.57 |
| 5,620,617 A | * | 4/1997 | Borowy et al. | 219/121.54 |
| 5,990,443 A | * | 11/1999 | Tatham et al. | 219/121.54 |

* cited by examiner

Primary Examiner—Mark Paschall
(74) Attorney, Agent, or Firm—Paul Y. Feng; Fulwider Patton Lee & Utecht, LLP

(57) ABSTRACT

The invention provides a plasma welding or brazing process in which a direct current pilot arc is maintained throughout the process. The process comprises the steps of setting a pilot arc power supply (6) to a relatively high level, generating a high voltage spark discharge between a non-consumable electrode (14) of a plasma welding or brazing torch (2) and a nozzle (18) of said torch in order to start the flow of a pilot arc current, detecting the pilot arc current and reducing the pilot arc current to a relatively low level. The invention further provides apparatus for carrying out plasma arc welding, comprising a plasma welding torch, a controller and a power supply. The controller further comprises means for detecting the flow of a pilot arc current and or a main arc current and means for reducing this current on detection.

34 Claims, 3 Drawing Sheets

WELDING APPARATUS AND METHOD

The present invention relates to an improved welding or brazing apparatus and to an improved method of welding or brazing. In particular, the invention relates to an improved method of plasma welding or brazing, more particularly plasma arc welding, and to an improved welding apparatus suitable for carrying out this method.

The plasma arc welding process, which is a particular type of Tungsten-Inert Gas Welding, has been known for several years and is widely used industrially, in particular in the automotive industry. The process has been used in particular for welding together steel components or workpieces and is also increasingly being used to weld aluminium.

Plasma arc welding uses a non-consumable electrode, typically of tungsten, fitted to a welding torch. The torch comprises a nozzle which creates a gas chamber surrounding the electrode. The arc which is generated between the electrode and the workpiece is a "transferred arc" and heats inert gas fed into the chamber to a temperature where it becomes ionized and conducts electricity, ie it becomes a plasma. By the term "transferred arc" is meant an arc which transfers from the electrode to the workpiece, so that the workpiece is part of the electrical circuit. The electrode is recessed within the nozzle so that it is not possible for it to touch the workpiece; this greatly reduces the possibility of contaminating the weld with electrode material.

In conventional arc welding, the arc is generated between a non-consumable electrode and the workpiece by establishing a voltage differential between the electrode and the workpiece, touching the electrode against the workpiece to initiate the arc and then withdrawing the electrode once the arc is initiated.

Since, in plasma arc welding, the recessed electrode cannot be touched against the workpiece in order to start the arc, it is first necessary to ignite a low-current pilot arc between the electrode and the nozzle. The pilot arc is a non-transferred arc and is generally generated by the use of high frequency AC power or by a high voltage d.c. pulse, which helps to break down the arc gap and ionize the gas flowing through the orifice of the nozzle, so that it will conduct the pilot arc current. By the term "non-transferred arc" is meant an arc which is established and maintained between the electrode and the nozzle, so that the workpiece is not in the electrical circuit. After initiation of the arc, a d.c. pilot arc is maintained.

In the plasma arc welding of steel workpieces, the workpiece is generally maintained at a positive voltage and the electrode at a negative voltage. This is beneficial since most of the heat required for welding is generated at the positive component, so that this polarity improves weld quality and increases electrode life.

In order to maintain a robust and effective pilot arc, it is necessary to ensure that the electrode is in good condition and does not deteriorate through ageing. If the electrode does age, and the pilot arc becomes weak, it is necessary to stop the process and change the electrode. This can be very costly when it involves stopping a production line for the time taken to change the electrode. In order to avoid this, it is standard practice to change electrodes before they age, at a time which is convenient, for example at the end of each shift, even if the electrode is not showing any signs of ageing. This has the disadvantage that electrodes are changed more frequently than is necessary, which leads to increased costs.

If the plasma arc welding of aluminium workpieces is being carried out, and the workpiece is maintained at a positive voltage and the electrode is maintained negative, then problems may arise because of the formation of an aluminium oxide coating on the surface of the aluminium. In order to remove this oxide coating, which inhibits the formation of a high quality weld, it has been found advantageous to vary the polarity of the electrode and the workpiece. The electrode is still maintained negative for most of the welding time, but the polarity is reversed during the welding, so that for typically 20 to 30% of the time, the electrode is positive.

It is a disadvantage of this process that the d.c. pilot arc, which is maintained throughout the welding, is superimposing a d.c. current on the variable polarity welding current. The d.c. current is flowing from a negative electrode to a positive workpiece, so that during the periods of reverse polarity the reverse current must be increased to compensate for the d.c. current.

The undesirably high positive polarity, applied during this reverse current period, leads to increased deterioration of the electrode and hence to an increase in the frequency with which the electrode must be replaced.

It is an object of the present invention to provide a welding or brazing process in which the above disadvantages are reduced or substantially obviated. It is a further object of the invention to provide a welding or brazing apparatus to carry out this process.

The present invention provides a welding or brazing process in which a direct current pilot arc is maintained throughout the process, characterised in that the process comprises the steps of setting a pilot arc power supply to a relatively high level, generating a high voltage spark discharge between a non-consumable electrode of a plasma torch and its attendant constricting orifice in order to start the flow of a pilot arc current, detecting the pilot arc current and reducing the pilot arc current to a relatively low level.

The invention further provides an apparatus for carrying out welding or brazing, comprising a welding or brazing torch, a controller and a power supply, characterised in that the controller further comprises means for detecting the flow of a pilot arc current and means for reducing this current on detection.

While the process according to the invention is particularly suitable for use in a plasma arc welding operation, it is also suitable for use in other welding, brazing and soldering operations, including plasma arc and plasma spot welding processes, which may be carried out with or without the use of a homogenous filler material, and brazing processes using a heterogeneous filler material, which may for example be a bronze based filler material.

In a preferred embodiment of the process according to the invention, the pilot arc current is maintained at the relatively low level, until welding is to be undertaken, the welding torch is positioned at the workpiece when welding is to occur, the pilot arc current is increased to a relatively high level, a welding arc is struck between the torch and the workpiece, the current flow of the welding arc is detected and the pilot arc current is reduced to the relatively low level.

In a particular preferred embodiment of the process according to the invention, the pilot arc current is increased as rapidly as possible to a predetermined relatively high level and reduced to the relatively low level once the welding arc is detected.

In an alternative particularly preferred embodiment of the process according to the invention, the pilot arc current is increased gradually towards a predetermined relatively high level, but is reduced to the relatively low level as soon as the welding arc is detected.

It is an advantage of the process according to the invention that it provides for improved reliability of starting the pilot arc under conditions where the electrode is subject to wear or erosion or of a design or material not conducive to starting of the pilot arc at a low current level. Reduction in the level of pilot arc current once the pilot arc is established reduces the thermal loading on the torch.

Where the process is carried out according to the preferred embodiment described above, in which the pilot arc is increased to a relatively high level before each welding operation, this improves the ability of the welding arc to transfer between the electrode and the workpiece.

A plasma arc welding process and a plasma arc welding apparatus will now be described with reference to the accompanying drawings, in which.

Figure 1:
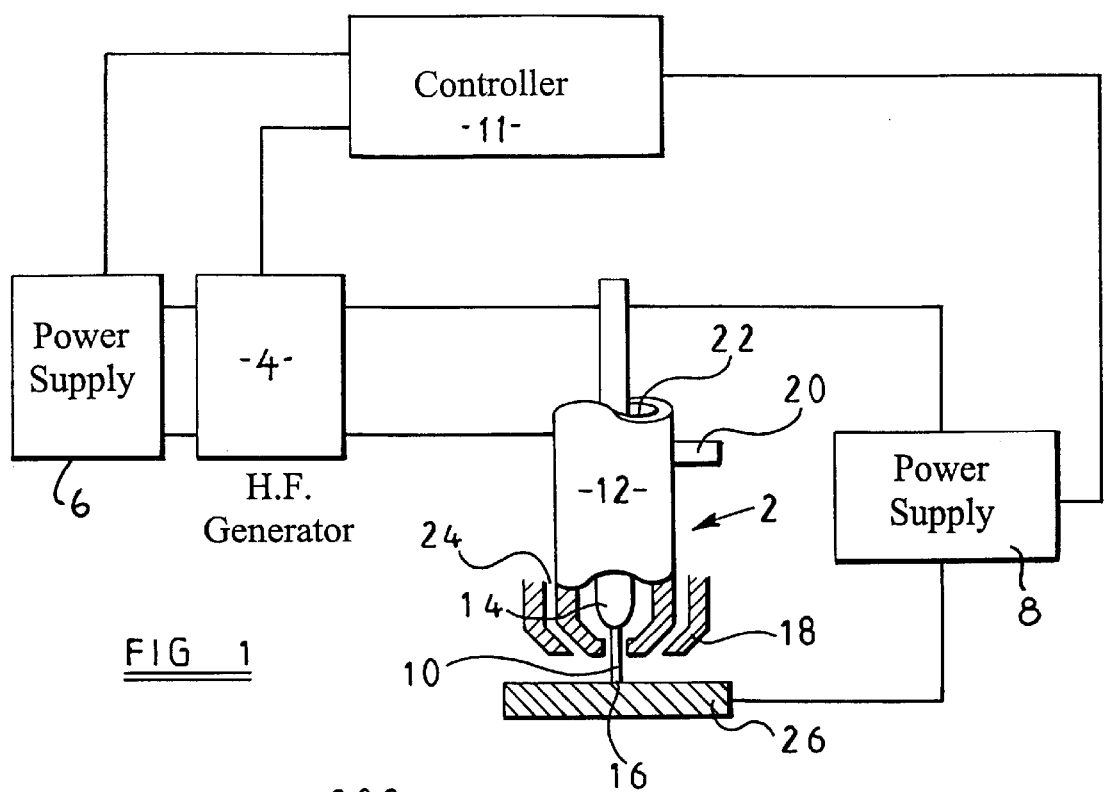
FIG. 1 is a schematic diagram of a plasma arc welding apparatus.

As can be seen from FIG. 1, a plasma arc welding apparatus comprises a plasma welding torch 2 connected to a high frequency generator 4 which is driven by a pilot arc power supply 6. A main arc power supply 8 supplies power to generate the welding arc 10. A controller 11 controls the power supplies 6 and 8. A housing 12 surrounds an electrode 14 and terminates in an orifice 16. A nozzle 18 surrounds the lower part of the housing 12, and cooling water is supplied to the housing 12 via a pipe 20.

Orifice gas is supplied to the orifice at 22 and a shielding gas which may be inert. is supplied at 24, between the outer nozzle 18 and the housing 12. A workpiece is shown schematically at 26.

Figure 2:
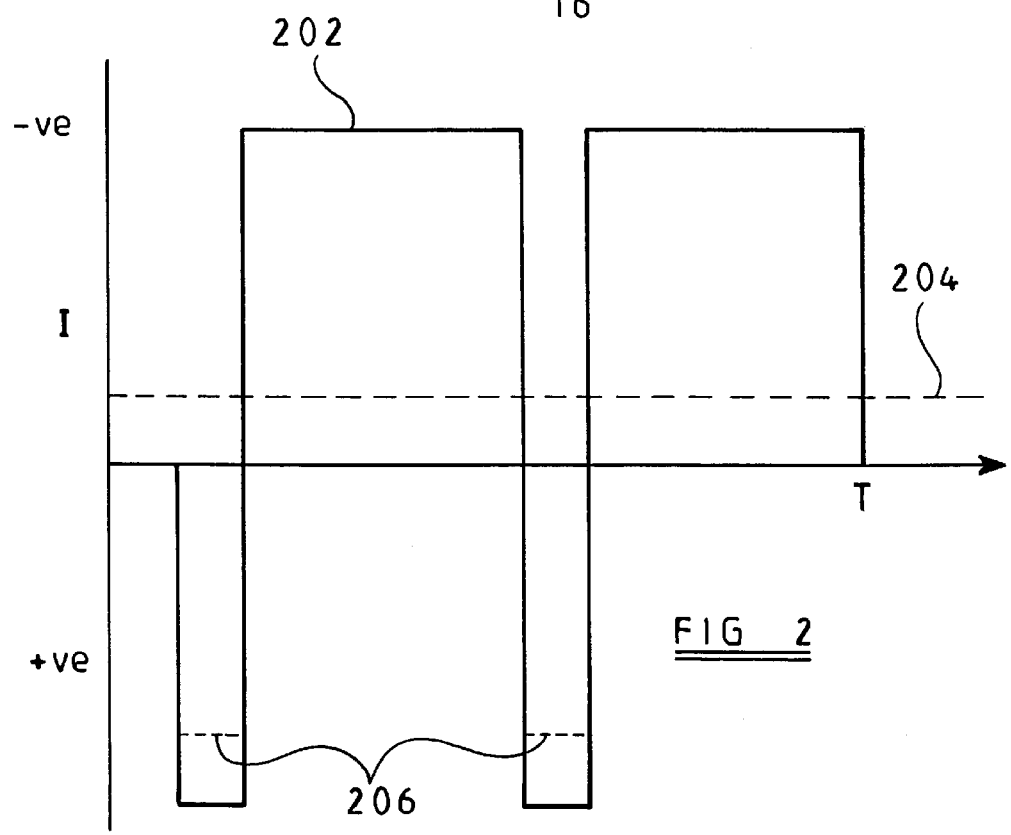
FIG. 2 is a diagram of a variable polarity current waveform, showing the effect of a low-level d.c. pilot arc current.

FIG. 2 shows a graph of current polarity of the electrode against time, using a variable polarity current. The solid line 202 shows the current being supplied to the electrode during welding, and the dotted line 204 represents the d.c. pilot arc current.

During the short periods of time that a positive current I is supplied to the electrode, the amplitude of the resultant current is reduced by the amplitude of the d.c. pilot arc current, producing the resultant current shown by the dotted line 206. This means that, in order to obtain the amplitude required for removal of the oxide coating, it is necessary to supply an increased positive current to the electrode, in order to overcome the pilot arc current.

Figure 3:
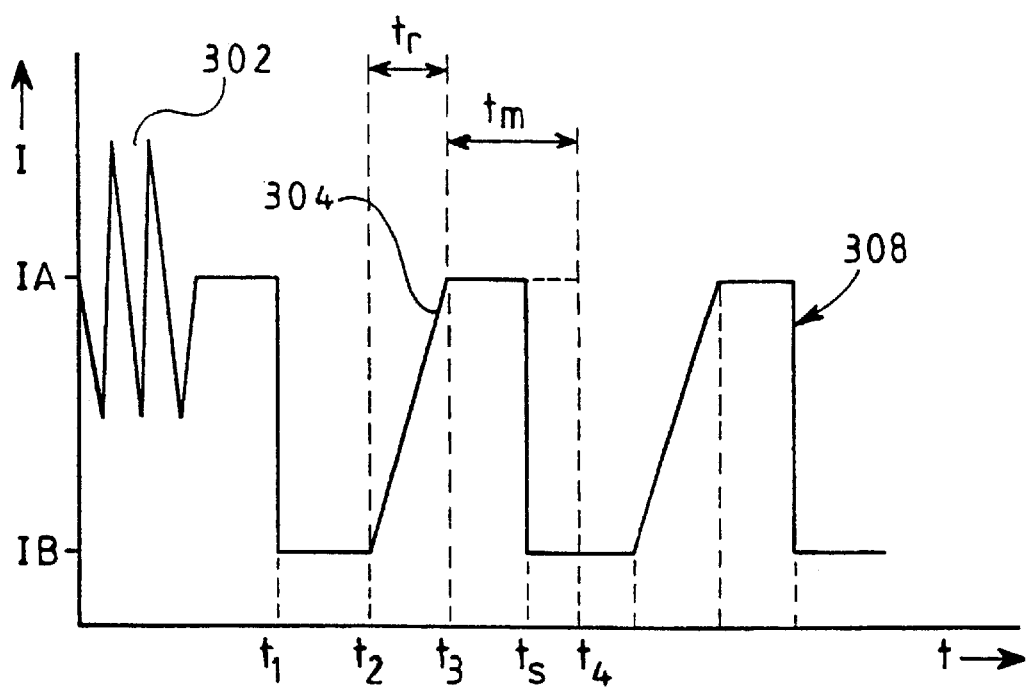
FIG. 3 is a graph of pilot arc current against time during a preferred form of plasma arc welding process according to the invention.

In a preferred embodiment of the welding process according to the present invention, a current against time profile as shown in FIG. 3 is adopted. In this process, a high voltage spark discharge 302 is generated between the electrode and the nozzle of the welding torch, in conventional manner, to establish a flow $I_A$ of pilot arc current, typically of around 90 A.

Once the pilot arc current has been detected by the controller, the controller reduces the pilot arc current at time $t_1$ almost instantaneously to a low level $I_B$, typically 15 A, preventing overheating of the torch components and/or reduction in their life while the pilot arc is running.

The controller then maintains the pilot arc at the low level $I_B$ until welding with a transferred arc is to be undertaken. The welding torch is then positioned at the workpiece, where a welding arc is to be started, at time $t_2$ and the controller sets the level of the welding arc current (and if necessary, closes the welding arc contactor). To assist striking of the welding arc, at time $t_2$ the controller begins increasing the pilot arc current to a high level, increasing the pilot arc intensity. The pilot arc current can be increased to its high level in one step (substantially instantaneously). However, it is preferably ramped up, as shown in FIG. 3 at 304, over time $t_r$. The increase can be in a gradual, continuous manner or stepped. When the increase is stepped each step is of typically 4 A or 5 A maintained over a time interval or step of 1 ms upwards, preferably between 1 ms and 100 ms and more preferably between 10 ms and 20 ms. The current is increased up to a value typically of around 90 A at time $t_3$. The ramping thus preferably takes place over approximately 1.5 seconds.

The 90 A current is held for a set maximum time $t_m$ of typically around 0.5 seconds. The intense pilot arc causes the welding arc to strike between the torch and workpiece and the current flow of the welding arc is detected by the controller at time $t_s$. The controller then reduces the pilot arc current to a low level e.g. $I_B$ since the welding arc is known to be established.

It will be appreciated that the invention is not limited to the application of the currents and time periods specified above. Variations in the above values, which are preferred values for a typical 100 A main are welding apparatus, may also be effective depending on the welding conditions and apparatus used.

If the welding arc does not become established after time $t_m$, the controller can either repeat the sequence (as shown at 308 in FIG. 3) or, if necessary, increase the pilot arc current still further to a higher value maintained for a further set time in an attempt to cause initiation of the welding arc. This step can be repeated several times, at each step the pilot arc becoming more intense.

Welding is performed with the welding arc whilst the pilot arc is maintained at a low level. Once the weld has been performed, the controller stops the welding arc. When the next weld is to be made the steps of the process can be repeated.

In a second embodiment of the process according to the invention shown in FIG. 4, the pilot arc current is generated at time 402 in a similar manner as is described in connection with FIG. 3, and similarly reduced at time $t_1$. Although the reduction is shown in FIGS. 3 and 4 as being almost instantaneous it will be appreciated that this would normally take place over a few milliseconds, typically 2 ms to 3 ms.

When welding with a transferred arc is to be undertaken, the welding torch is positioned at the workpiece at time $t_2$ and the controller sets the level of the welding arc current (and, if necessary, closes the welding arc contactor). To assist starting of the welding arc, the controller increases the pilot arc current gradually, for example using the incremental steps described in relation to FIG. 3. When the pilot arc reaches a level, at time $t_s$, at which the pilot arc causes the welding arc to strike between the torch and the workpiece, the current flow of the welding arc is detected and the controller then reduces the pilot arc current to a low level.

Figure 4:
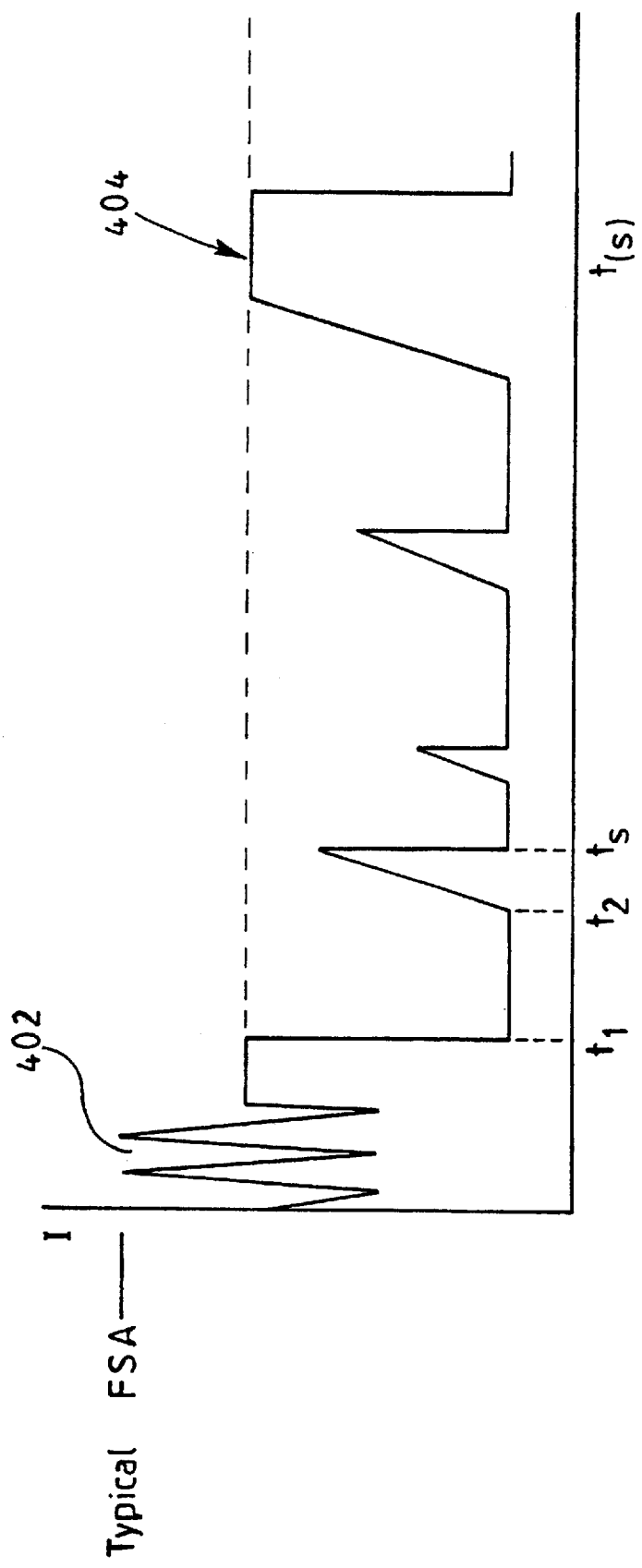
FIG. 4 is a graph of pilot arc current against time during a second form of plasma arc welding process according to the invention.

It can be seen that in the embodiment of FIG. 4, the level of the pilot arc current only rises to a level sufficient to cause the main arc to strike, in contrast with that of FIG. 3 in which the pilot arc current rises to a predetermined level regardless of when the main arc strikes.

If the main arc fails to strike the controller can either repeat the sequence (as shown at 404 in FIG. 4) or, if necessary, increase the pilot arc current still further to a higher value maintained for a further set time in an attempt to cause initiation of the welding arc. This step can be repeated several times, at each step the pilot arc becoming more intense, as is described in relation to FIG. 3.

The embodiment of FIG. 4 is advantageous since it can reduce the amount of heat generated by the pilot arc current and thus reduce the wear on the electrode.

It will be appreciated that a maximum current limit may be set when this embodiment is used.

The ramping up of the pilot arc current is particularly advantageous for aluminium welding since it allows the oil or wax based pressing lubricants, often applied to aluminium, to burn off or melt fully before the main arc is generated. This allows a more effective weld to be made. The ramping time steps can be chosen between 20 ms and 100 ms or greater depending on the number of wax layers, their thicknesses and melting points.

In the process according to the invention, "low level" in terms of pilot arc current is, for example, from 1 to 30 amps.

"High level" in terms of pilot arc current is, for example, from 30 amps to 300 amps. Typically around 100 amps appears to be appropriate with conventional welding torches.

It is found that for high level welding apparatus such as those having a 500 A main arc rating, an initial pilot arc of around 15 A to 30 A may be used which is increased up to around 90 A to 150 A in order to generate the main arc effectively.

The rate at which current is increased or decreased between "high" and "low" levels depends upon how quickly the "current detection" devices of either the pilot arc or welding arc power supplies can react, as current flow must be seen to be established before alteration of the current. Anything from a few milliseconds to several hundred milliseconds may be needed. Additional "settling time" may be needed however, due to fluctuation and random instabilities within both the pilot arcs and welding arcs.

Some designs of "welding" torch may require currents or times very different to those above to be used.

What is claimed is:

1. A method of starting a plasma arc torch for a welding or brazing process wherein the torch has a nozzle and a non-consumable electrode, the method comprising:
    setting a pilot arc power supply to a first, high level and generating a high voltage spark discharge between the non-consumable electrode of the plasma arc torch and the nozzle of said torch in order to start the flow of a pilot arc current;
    detecting the pilot arc current;
    and prior to starting a main arc of said torch, reducing the pilot arc current to a second, low level in response to said detection;
    wherein said second, low level of said pilot arc current is sufficient to maintain said pilot arc.

2. A method according to claim 1 further comprising:
    after reducing the pilot arc current to said second, low level, positioning the torch at a workpiece when welding or brazing is to be undertaken and setting the level of the main arc current;
    increasing the pilot arc current to a high level thereby to assist striking of the main arc;
    monitoring the presence or absence of the main arc;
    and reducing the pilot arc current to a low level in response to detection of said main arc;
    wherein said second, low level of said pilot arc current is sufficient to maintain said pilot arc.

3. A method as claimed in claim 2 wherein the pilot arc current is reduced to said low level in response to detection of said main arc after the pilot arc current has reached said high level.

4. A method as claimed in claim 2 wherein the pilot arc current is reduced to said low level immediately in response to detection of said main arc.

5. A method as claimed in claim 2 wherein the pilot arc current is increased to said high level thereby to assist striking of the main arc, is maintained at said high level for a preset time and is then reduced to a low level in the absence of detection of said main arc.

6. A method as claimed in claim 5 further comprising repeating step, after reducing said pilot arc current to said low level in the absence of detection of said main arc, again increasing the pilot arc current to said high level thereby to assist striking of the main arc.

7. A method as claimed in claim 2 wherein the step of increasing the pilot arc current to said high level thereby to assist striking of the main arc comprises increasing the pilot arc current level in preselected current increments.

8. A method as claimed in claim 7 wherein each increment is substantially 4 amps.

9. A method as claimed in claim 7 wherein each increment is maintained for a minimum time period of 20 ms.

10. A method as claimed in claim 7 wherein each increment is maintained for a time period in the range of 1 ms to 100 ms.

11. A method as claimed in claim 7 wherein each increment is maintained for a time period in the range of 10 ms to 20 ms.

12. A method as claimed in claim 2 wherein the step of increasing the pilot arc current to said high level thereby to assist striking of the main arc comprises increasing the pilot arc current level in a continuous manner.

13. A method as claimed in claim 2 wherein the pilot arc current is increased rapidly to a predetermined relatively high level.

14. A method as claimed in claim 2 wherein the pilot arc current is increased gradually until the current flow of the welding arc is detected.

15. A method according to claim 1 wherein the relatively low level of pilot arc current is between 1 amp and 30 amps.

16. A method according to claim 2 wherein the relatively high level of pilot arc current is between 30 amps and 300 amps.

17. A method according to claim 16 wherein the relatively high level of pilot arc current is approximately 100 amps.

18. A plasma arc torch apparatus, comprising:
    a nozzle;
    a non-consumable electrode having a tip spaced from said nozzle;
    a pilot arc power supply for supplying pilot arc current;
    a main arc power supply for supplying main arc current; and
    a controller for controlling the supply of power from said power supply to said electrode during starting of a pilot arc and firing of a main arc;
    wherein the controller further comprises:
        a sensor for detecting the flow of a pilot arc current;
        and a control circuit for reducing the pilot arc current on detection,
        and said controller is configured to set said pilot arc power supply to a first, high level to generate a high voltage spark discharge between the non-consumable electrode and said nozzle in order to start the flow of a pilot arc current, and to reduce the pilot arc current to a second, low level sufficient to maintain said pilot arc in response to said detection and prior to starting a main arc of said torch.

19. An apparatus according to claim 18 further comprising a sensor for monitoring the presence or absence of the main arc; and wherein during starting of said main arc said controller is further configured to set the level of the main arc current, to increase the pilot arc current to a high level thereby to assist striking of the main arc, and to reduce the pilot arc current to a low level sufficient to maintain said pilot arc in response to detection of said main arc.

20. Apparatus according to claim 19 wherein said controller is adapted to reduce the pilot arc current to said low level in response to detection of said main arc after the pilot arc current has reached said high level.

21. Apparatus according to claim 19 wherein said controller is adapted to reduce the pilot arc current to said low level immediately in response to detection of said main arc.

22. Apparatus according to claim 19 wherein said controller is adapted to increase the pilot arc current to said high level thereby to assist striking of the main arc, to maintain the pilot arc current at said high level for a preset time and then to reduce the pilot arc current to a low level in the absence of detection of said main arc.

23. Apparatus according to claim 22 wherein said controller is adapted, after reducing said pilot arc current to said low level in the absence of detection of said main arc, to increase the pilot arc current to said high level thereby to assist striking of the main arc.

24. Apparatus according to claim 19 wherein said controller is adapted to increase the pilot arc current to said high level in preselected current increments.

25. Apparatus according to claim 19 wherein said controller is adapted to increase the pilot arc current to said high level in preselected current increments of substantially 4 amps.

26. Apparatus according to claim 24 wherein each increment is maintained for a minimum time period of 20 ms.

27. Apparatus according to claim 24 wherein each increment is maintained for a time period in the range of 1 ms to 100 ms.

28. Apparatus according to claim 24 wherein each increment is maintained for a time period in the range of 10 ms to 20 ms.

29. Apparatus according to claim 19 wherein said controller is adapted to increase the pilot arc current to said high level in a continuous manner.

30. Apparatus according to claim 19 wherein said controller is adapted to increase the pilot arc current rapidly to a predetermined relatively high level.

31. Apparatus according to claim 19 wherein said controller is adapted to increase the pilot arc current gradually until the current flow of the welding arc is detected.

32. Apparatus according to claim 19 wherein the relatively low level of pilot arc current is between 1 amp and 30 amps.

33. Apparatus according to claim 19 wherein the relatively high level of pilot arc current is between 30 amps and 300 amps.

34. Apparatus according to claim 19 wherein the relatively high level of pilot arc current is approximately 100 amps.

* * * * *

UNITED STATES PATENT AND TRADEMARK OFFICE
CERTIFICATE OF CORRECTION

PATENT NO. : 6,566,625 B1
DATED : May 20, 2003
INVENTOR(S) : Russell Veron Hughes It is certified that error appears in the above-identified patent and that said Letters Patent is hereby corrected as shown below:

<u>Column 6,</u>
Line 14, delete "repeat step".

Signed and Sealed this

Twenty-third Day of September, 2003

JAMES E. ROGAN
*Director of the United States Patent and Trademark Office*